United States Patent [19]

Califano

[11] Patent Number: 5,099,690

[45] Date of Patent: Mar. 31, 1992

[54] FIBER-OPTIC GYROSCOPE ACCELEROMETER

[75] Inventor: Herbert T. Califano, Bloomingdale, N.J.

[73] Assignee: Allied-Signal Inc., Morris Township, Morris County, N.J.

[21] Appl. No.: 386,758

[22] Filed: Jul. 31, 1989

[51] Int. Cl.⁵ .......................... G01P 9/02; G01P 15/08
[52] U.S. Cl. .......................................... 73/510; 73/504
[58] Field of Search ............ 73/504, 505, 510, 517 R; 340/870.28; 250/227, 231 GY, 227.14, 227.19, 231.12

[56] References Cited

U.S. PATENT DOCUMENTS

| | | | |
|---|---|---|---|
| 4,175,230 | 11/1979 | Richards et al. | 340/870.28 |
| 4,222,272 | 9/1980 | Mairson | 73/517 R |
| 4,353,259 | 10/1982 | Schneider | 73/510 |
| 4,457,173 | 7/1984 | Hunter | 73/504 |
| 4,518,962 | 5/1985 | Imose et al. | 340/870.28 |
| 4,739,661 | 4/1988 | Bucholtz et al. | 73/517 R |
| 4,900,918 | 2/1990 | Killian | 250/227.19 |

Primary Examiner—John E. Chapman
Attorney, Agent, or Firm—Donald B. Paschburg; Howard G. Massung; Robert A. Walsh

[57] ABSTRACT

An inertial measurement instrument including a gyroscope and accelerometer utilizes fiber optics to measure gyro rates and accelerations in two orthogonal axes. Bender beam fiber optic transducers are mounted on a rotating shaft and signals representative of force effects on the bending beams are provided at the rotor in an optical format. The signals are then optically transmitted to the stator thereby eliminating the need for slip rings and the like.

9 Claims, 6 Drawing Sheets

FIBER-OPTIC GYROSCOPE ACCELEROMETER

FIELD OF THE INVENTION

This invention relates to inertial measurement instruments and more particularly to an improved inertial measurement instrument which uses light and interferometry to measure rate and acceleration. This invention further relates to enhancing the rate and acceleration signals via a modulating scheme using rotating masses and to optical coupling of interferometric signals through rotating unions. The invention may be embodied in either a gyroscope or accelerometer or both to form a multisensor.

BACKGROUND OF THE INVENTION

Present gyroscope-multi-axis accelerometer equipment bias performance of 2 deg/hr to 10 deg/hr and 0.2 milli "g" to 2 milli "g". Such equipment which uses piezoelectric bender beam transducers have inherently high electrical impedance and communicate from the rotor to the signal processor via sliprings. The sliprings limit the performance, useful instrument life and reliability, therefore reducing the product use to short time missions such as tactical missiles.

Prior art gyroscopes include spinning wheel gyroscopes, vibrating mass gyroscopes and Sagnac phase shift gyroscopes such as ring laser gyroscopes (RLGs) and fiber optic gyroscopes (FOGs). A hybrid gyroscope has been developed in which piezoelectric beams are caused to rotate about an axis. A rate input at other than the spin axis causes the beams to deflect, and the deflection is measured through electrical impedance. Changes in impedance are caused by the piezoelectric effect of the bending moments on the beam. Accelerometers, however, have been combined with gyroscopes in order to provide "multisensor" configurations in which various forms of rate are measured for navigation purposes. The accelerometer compliments the gyroscopic rate information and provides for the correlation of data which enhances the accuracy of both the accelerometer and the gyroscope. It has always been necessary, however, to include the unreliable slip ring contacts for electrical communication.

It is an object of the invention to provide a low cost, compact and accurate system for gyroscopically measuring rate and for measuring acceleration. Ideally, such rate information must be accurate enough to be used over extended ranges and extended time periods without constant updating.

SUMMARY OF THE INVENTION

The present invention utilizes bender beam fiber optic transducers attached to a rotor and an optical signal commutation scheme to measure rates and accelerations in two orthogonal axes. The bender beams are mechanically and electrically connected in two configurations. One configuration provides two axes of gyro rate information, while the second configuration provides two axes of acceleration information. These features along with small size and low cost make the invention ideally suited for various applications.

The sensor bender beams are interferometers constructed by either integrated optics or discrete element optical components configured with fiber optic cable. The fiber-optic interferometer sensor construction uses optical fiber integrally mounted to a bender beam, one leg on the top and one leg on the bottom in such a manner that one leg extends (lengthens) while the other leg contracts (shortens) by virtue of the beam bending. The integrated optics interferometer sensor utilizes interferometers constructed via optical wave guides imbeded within the top and bottom faces of the substrate to form the two sensor legs and the associated optical couplers. The function of the integrated optics sensor beam is the same as for the fiber-optics version. The interferometers are mounted on a rotating shaft and the interference fringe information is commutated optically. The invention comprises a unique integration of an optically commutated, rotating, interferometer to sense inertial rates via Coriolis force accelerations acting to deflect the bender beam and to sense acceleration by the bending of the beam (mass) due to linear accelerations.

No electrical power or electrical signal commutation is required The commutation is optical and is used to both excite the interferometer and to read the output signals. In this configuration the output signals are optically commutated to the fixed case. The output may be digital or analog depending on the instrument scaling or a combination of digital and analog to provide both fine and course output resolution. Wavelength multiplexing may be utilized to enhance resolution and range.

In one aspect of the invention, a rate and acceleration sensor are constructed in which rates and accelerations are sensed by components which are fixed to a moving rotor assembly. Signals corresponding to inertial forces generated on the rotor components provide optical signal outputs. The optical signals are transmitted from the rotor to a stator assembly and along with shaft position resolve the two acceleration and gyroscopic components.

DETAILED DESCRIPTION OF THE PREFERRED EMBODIMENTS

Figure 1:
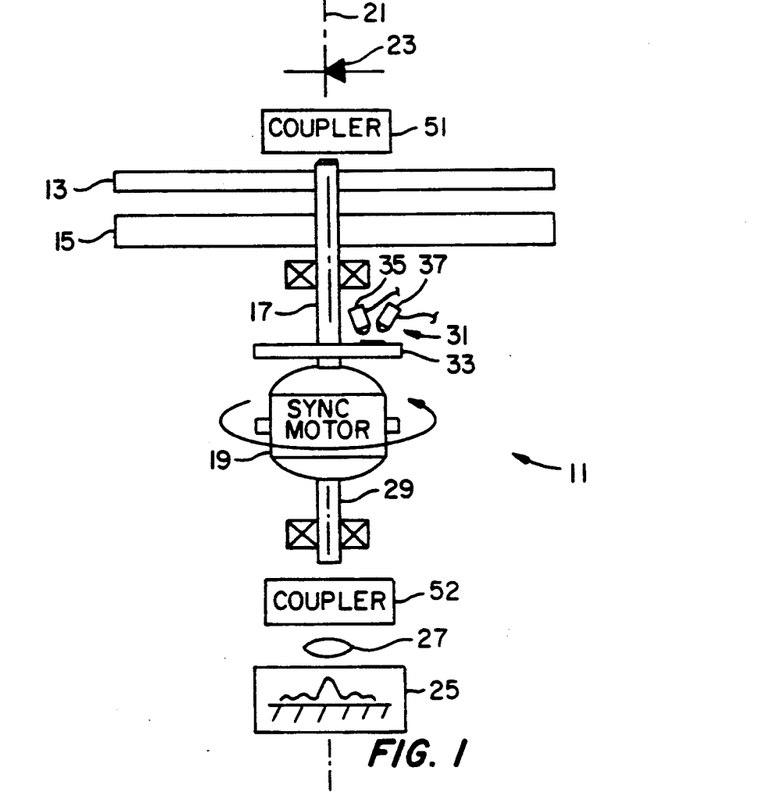
FIG. 1 illustrates a fiber optic gyroscope accelerometer (FOGA) constructed in accordance with the present invention.

Turning now to the drawings wherein like reference characters refer to like and corresponding parts throughout the several views, FIG. 1 illustrates a configuration of a fiber optic gyroscopes-accelerometer 11, in which sensor elements 13, 15 are mounted to a center shaft 17 in a dipole fashion. A synchronous motor 19 causes the shaft 17 and the sensor elements 13, 15 to rotate about a center spin axis 21. Light is transmitted from a fiber light source 23 to the center shaft 17 through an optical coupler 51. The shaft 17, thru suitable fiber optics, transmits the light to and from the sensor elements 13, 15 through a coupler 52 and to an output detection circuit 25. The light source 23 and the output detection circuit 25 are preferably mounted to a frame stationary with respect to shaft 17. Lens 27 may remain stationary or rotate with shaft 17, in accordance with a specific design which permits isolation of the accelerometer interferometer information from the Gyro interferometer information. Shaft 17 is supported by suitable bearings and is rotated with its associated components including sensor elements 13, 15. The coupling of the shaft 17 with the light source 23 and output detection circuit 25 is optical. This construction allows signal power to be transmitted to the rotor position 29 of the gyro accelerometer 11, independent of power for the motor 19. Shaft position information is obtained from an optical position encodor 31, an encoder wheel 33 and light transmitters and receivers 35, 37. Suitable rotary position encoders of various types are well known in the art.

Figure 2:
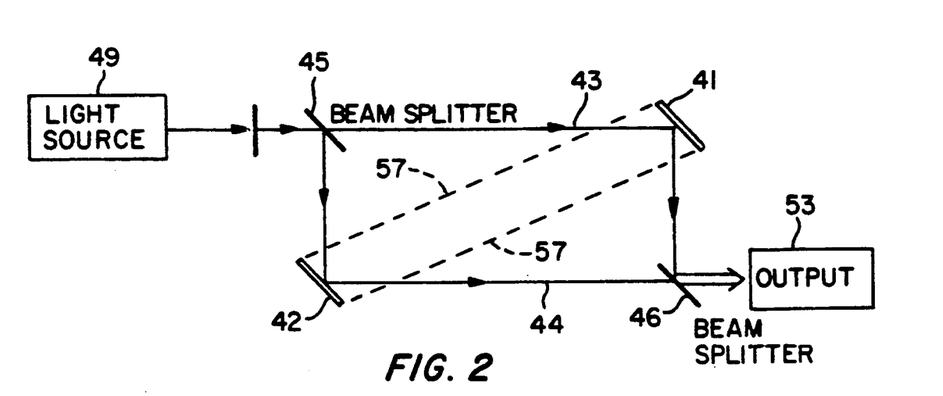
FIG. 2 illustrates the optical configuration of a Mach-Zender interferometer.

Sensor element 13 serves as a gyroscopic rate sensor and sensor element 15 serves as an acceleration sensor. Formed within each sensor 13, 15 is a modified Mach-Zender interferometer arrangement which is schematically shown in FIG. 2. The implementation of the claimed invention via a traditional Mach-Zender interferometer includes a pair of mirrors 41, 42 and a pair of beam splitters 45, 46. Light from a source 49 is directed thru one of the beam splitters 45 which causes the light to travel along two different paths 43, 44, to a second beam splitter 46. In the Mach-Zender interferometer, a difference in the spacial index of refraction of the media through which the light passes in each path 43, 44 results in an interferometric phase shift. This phase shift can be detected at the output 53. The Mach-Zender interferometer is modified for the present invention by placing the light paths 43, 44 thru optical fibers which lie along the top and bottom of the thin profiles of sensor elements 13, 15. A path length change between path 1, 43 and path 2, 44 will cause interference fringes, Ml as seen by the observer at the output 53, to move by the relationship:

$$Ml = x/\lambda,$$

where
M = number of fringe shifts
x = path length change
λ = wavelength of the light The construction is such that the mirrors 41, 42 are mechanically coupled, as shown by line 57. Positive displacement on one mirror 41 or 42 will result in negative displacement of the other mirror 42 or 41. This displacement of the mirrors 41, 42 has an effect of further shifting the fringe patterns, as the alignment of the optical path length at beam splitter 46 is shifted. The modified Mach-Zender interferometer provides common mode rejection of temperature, noise, unwanted strain and magnetic fields.

Figure 3:
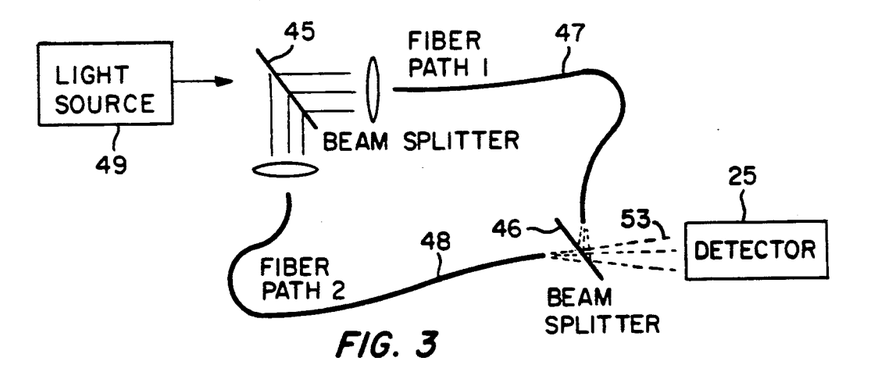
FIG. 3 illustrates the Mach-Zender interferometer implemented by using fiber optics.

FIG. 3 shows the Mach-Zender interferometer implemented by using fiber optics. Light from a bulk optics source 49 is directed thru one of a pair of beam splitters 45 which causes the light to travel along either fiber path 1, 47 or fiber path 2, 48. After traveling through the fiber paths 47, 48 the light flows to the second beam splitter 46 and exists as output 53 and is detected by an output detection circuit 25. The difference in the spacial media through which the light passes in each path 47, 48 results in an interferometric phase shift which is detected at the output 53. Because of the use of fiber paths 1 and 2, 47, 48 no mirrors are required.

Figure 4:
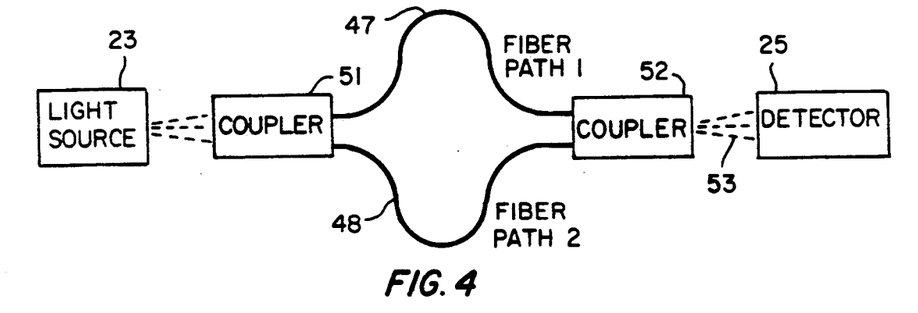
FIG. 4 illustrates the Mach-Zender interferometer implemented by using fiber optics and a pair of couplers.

FIG. 4 illustrates the Mach-Zender interferometer implemented by using fiber optics and a pair of couplers 51, 52 instead of beam splitters 45, 46. Light from a fiber light source 23 flows into the fiber coupler 51 and divides into either fiber path 1, 47 or fiber path 2, 48. After traveling through the fiber paths 47, 48 the light flows to the second coupler 52 to an output 53 and is detected by an output detection circuit 25. Once again, the difference in the spacial media through which the light passes in each path 47, 48 results in an interferometric phase shift which is detected at the output 53. No beam splitters 45, 46 or mirrors 41, 42 are required in this configuration. The fringe shift, Ml due to the path length change is once again:

$$Ml = \frac{\text{change in path length \#1} + \text{change in path length \#2}}{\lambda(\text{wavelength of light})}$$

However, a fringe shift occurs due to a photoelastic effect, Δn, caused by the induced strain in each fiber path 47, 48. Therefore, the total fringe shift is $$M = \frac{n\Delta l + l\Delta n}{\lambda}$$

n = core refractive index
l = path length
λ = wavelength of light

Figure 5:
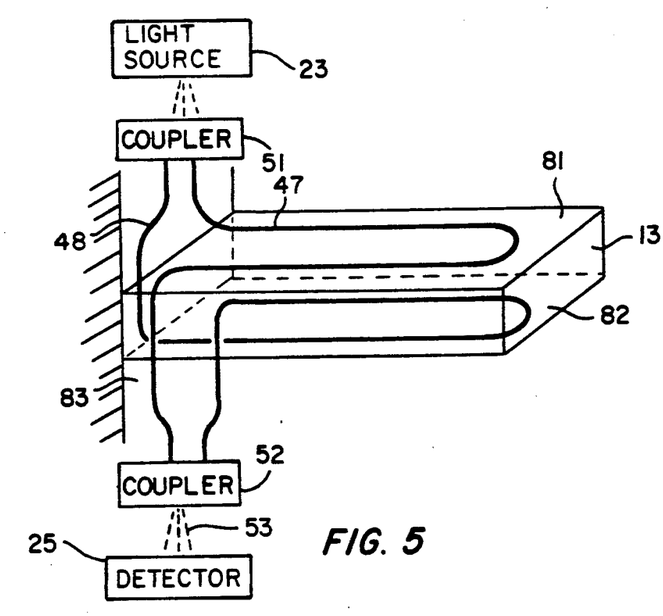
FIG. 5 illustrates a Mach-Zender strain transducer.

FIG. 5 illustrates a Mach-Zender Strain Transducer in which a portion of a gyro sensor element 13 is introduced. The fiber light source 23, the pair of couplers 51, 52, the fiber paths 47, 48, the detector 25 and their relationships are the same as that of FIG. 4. The fiber paths 47, 48, however, travel along the top 81 and bottom 82 surfaces of sensor element 13. This sensor element 13 extends perpendicularly from a strain sensitive axis 83. As strain takes effect, the top surface 81 or the bottom surface 82 of the sensor element 13, lengthens or shortens accordingly. As the surfaces lengthen or shorten, so does their associated fiber paths 47, 48. As an example, if strain forces the sensor element 13, downward, the top surface fiber path 47 elongates and the bottom surface fiber path 48 shortens. This difference in spacial media through which the light passes in each path 47, 48 results in an interferometric phase shift which is detected at the output 53 by an output detection circuit 25. Also, interferometer sensitivity can be enhanced by increasing the number of fiber optic paths or by enhancing the photoelastic effect Δn.

Figure 6:
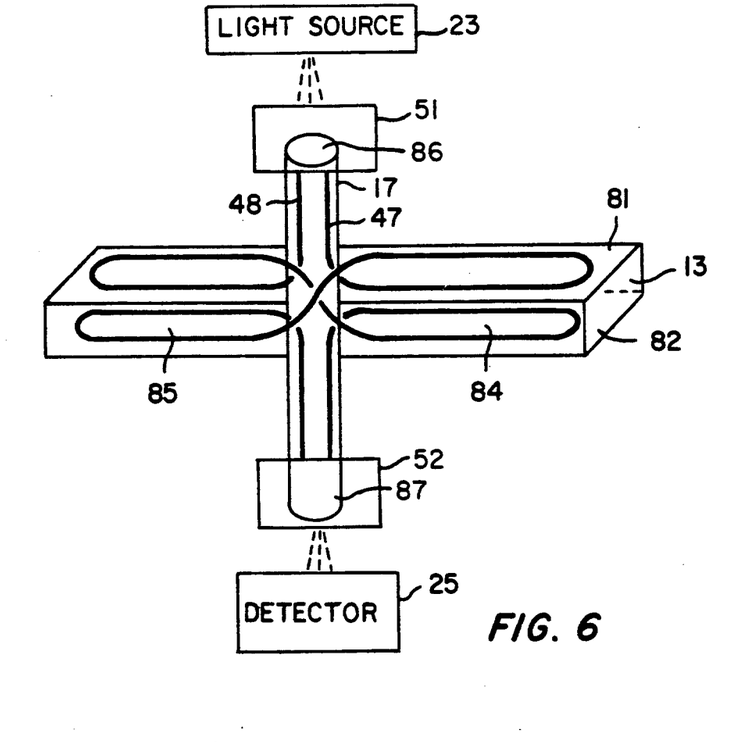
FIG. 6 illustrates the flow of the fiber optic paths on a gyro sensor element.

FIG. 6 illustrates the flow of the fiber optic paths 47, 48 when an entire gyro sensor element 13 is mounted to a center shaft 17 in a dipole fashion. As shown, light from the fiber light source 23 enters through coupler 51 and into fiber path 1, 47 which flows from the top 86, down through the center of the shaft 17 and out along the top surface 81 of the right side 84 of gyro sensor element 13. Fiber path 1, 47 then circles back across the center shaft 17 and out along the bottom surface 82 of the left side 85 of sensor element 13. Fiber path 1, 47 again circles back and flows through the center shaft 17 to the bottom 87 of the center shaft 17. Fiber path 2, 48 flows from the top 86, down through the center shaft 17 parallel with fiber path 1, 47 and out along the top surface 81, of the left side 85, the opposite side from fiber path 1, of the sensor element 13. Fiber path 2, 48 then cirles back across the center shaft 17 and out along the bottom surface 82 of the right side 84 of the sensor element 13. Fiber path 2, 48 again circles back and flows through the center shaft 17, parallel with fiber path 1, 47, to the bottom 87 of the center shaft 17. At the bottom 87 of the center shaft 17, the difference in spacial media between fiber path 1, 47 and fiber path 2, 48, results in an interferometric phase shift which is effected by coupler 52 and detected by the output detection circuit 25.

Figure 7:
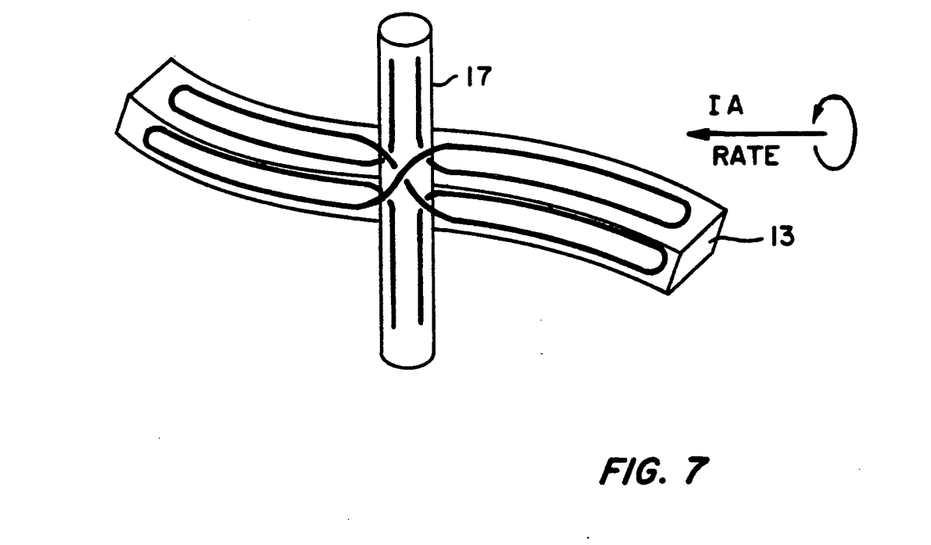
FIG. 7 illustrates a modified Mach-Zender interferometer under the effect of an I.A. rate vector.

FIG. 7 illustrates the sensor element 13 of one modified Mach-Zender interferometer that evolved through FIGS. 2-6. In FIG. 7, however, the interferometer is under the effect of an I.A. (Input Axis) rate vector Since the center shaft 17 which is attached to the gyro sensor element 13 is rotating, Coriolis acceleration effects on the rotating gyro sensor element 13 results in a gyroscopic response which occurs at 90 degrees from the input axis. This results in a bending of the gyro sensor element 13. By incorporating the modified Mach-Zender interferometer rate can be measured by detecting changes in the fringe patterns of the interferometer output.

Figure 8:
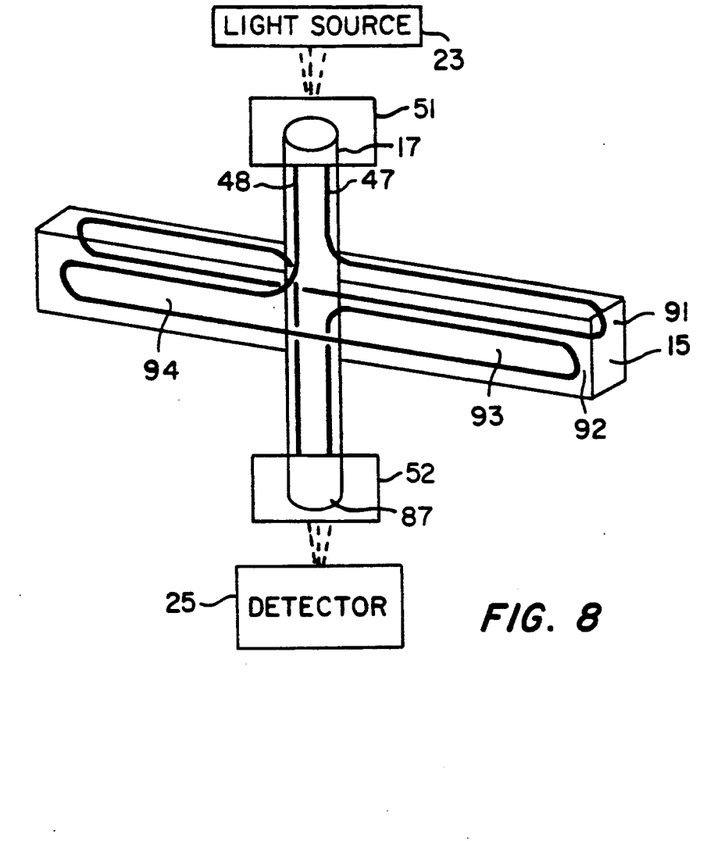
FIG. 8 illustrates the flow of the fiber optic paths on an accelerometer sensor element.

FIG. 8 illustrates the flow of the fiber optic paths 47, 48 through an accelerometer sensor element 15 which is mounted to the center shaft 17 in a dipole fashion. The acceleration sensor element 15 is oriented at 90 degrees to the gyro sensor element 13. As shown, light from the fiber light source 23 enters through coupler 51 and into fiber path 1, 47 which flows down through the center of the shaft 17 and out along the back surface 91 of the right side 93 of the accelerometer sensor element 15. Fiber path 1, 47, again circles back and flows through the center shaft 17 to the bottom 87 of the center shaft 17. Fiber path 2, 48 flows down the center of the shaft 17, parallel with fiber path 1, 47, and out along the front surface 92 of the left side 94, the opposite side from fiber path 1, of the sensor element 15. Fiber path 2, 48, then circles back across the center shaft 17 and out along the front surface 92 of the right side 93 of sensor element 15. Fiber path 2, 48 again circles back and flows through the center shaft 17, parallel with the fiber path 1, 47 to the bottom 87 of the center shaft 17. At the bottom 87 of the center shaft 17, the difference in spacial media between fiber path 1, 47 and fiber path 2, 48, results in an interferometric phase shift which is effected by coupler 52 and detected by the output detection circuit 25.

Figure 9:
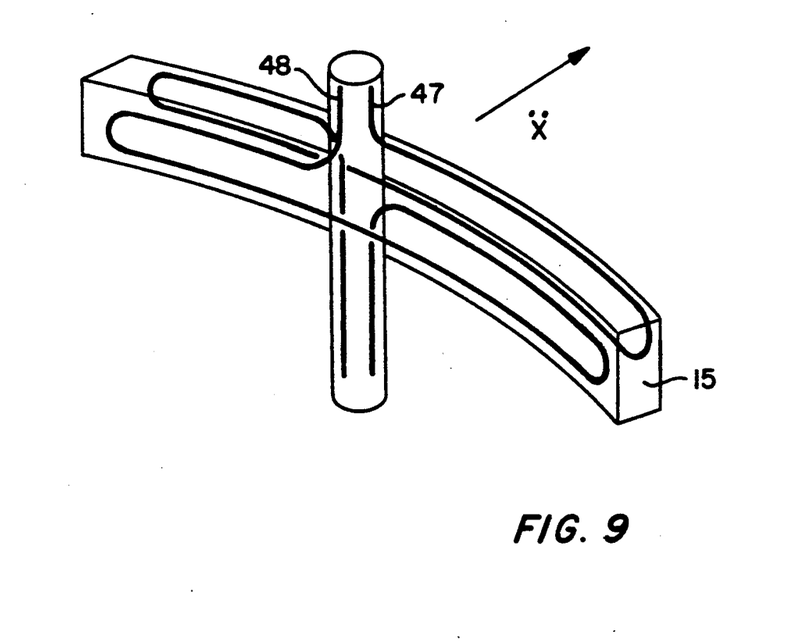
FIG. 9 illustrate a modified Mach-Zender interferometer under the effect of linear acceleration.

FIG. 9 illustrates the sensor element of the modified Mach-Zender interferometer where the accelerometer sensor element 15 is bending in response to linear acceleration in the direction shown. In this specific example, fiber path 2, 48 shortens and fiber path 1, 47 elongates This causes a difference in spacial media which results in an interferometric phase shift which is detected. The amplitude of the detected signal is proportional to the amount of linear acceleration applied.

Figure 10:
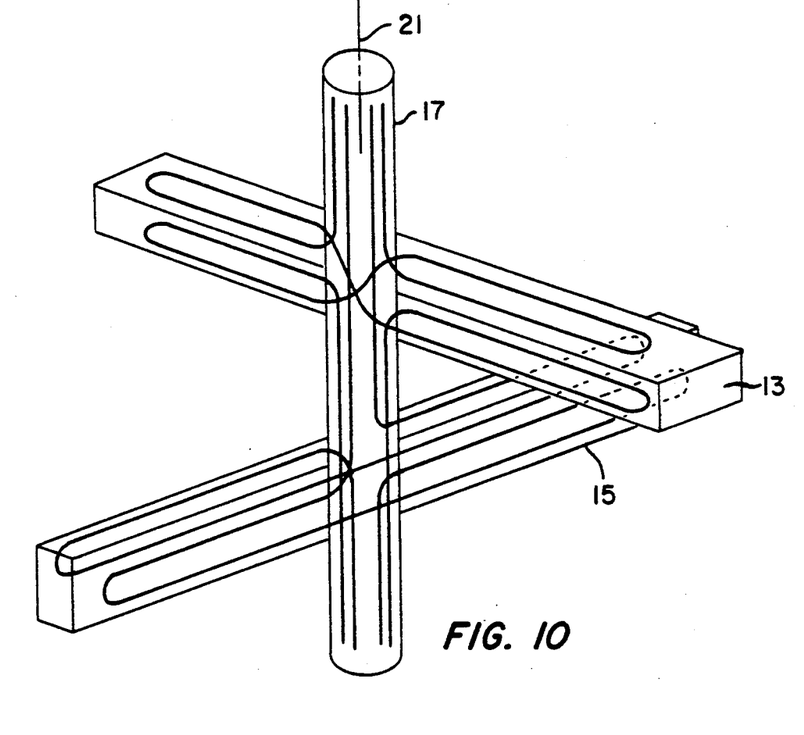
FIG. 10 illustrates a modified Mach-Zender interferometer having both a gyro sensor element and an accelerometer sensor element.

FIG. 10 illustrates a gyro sensor element 13 and an accelerometer sensor element 15 of a modified Mach Zender interferometer. This configuration can be used to measure angular velocity as well as the effects of linear acceleration. As discussed earlier, the sensor elements 13, 15 are mounted on a rotating shaft 17 and are arranged in a dipole fashion for signal enhancement and common mode rejection. The acceleration sensor element 15 is oriented at 90 degrees to the gyro sensor element 13. The rotation of the sensor elements 13, 15 causes the inertial motion to be sensed and converted into sinsuoidal output voltage. The amplitude is proportional in input and the carrier frequency is at wheel speed.

Gyro sensor element 13 deflects in a plane coincident with spin axis 21. Accelerometer sensor element 15, due to its orientation, deflects in a plane perpendicular to spin axis 21 and does not significantly respond to angular velocity but is completely responsive to linear acceleration.

As stated earlier, sensitivity of the interferometers may be enhanced by increasing the optical paths in the sensing elements 13, 15. Additional enhancement can be obtained by increasing the photoelastic effect, $\Delta n$, of the light path media.

Figures 11, 13:
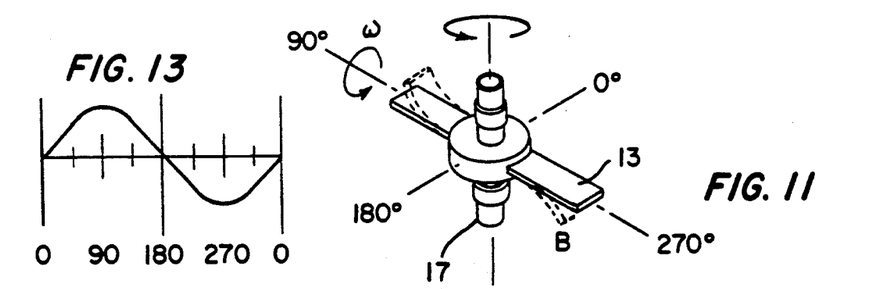
FIGS. 11-14 illustrate the phase relationships between the rotor and gyro and accelerometer interferometers.

FIGS. 11-14 illustrate the effects of deflection upon the gyro and accelerometer sensor elements 13, 15. FIG. 11 shows that rotation of shaft 17 imparts angular momentum to the gyro sensor element 13. The reaction of gyro sensor element 13 to the input rate $\omega$, via the Coriolis effect will result in one side of the sensor element 13 bending up and the other side of sensor element 13 bending down. The effect on the interferometer as embodied in sensor element 13 is to provide an optical output, interferometric fringes. The signal output, fringe frequency or fringe displacement is determined by the magnitude of the input rate (vector) $\omega$, the instantaneous position of the sensor element 13 about the axis of rotation and the sensor beam scale factor. The graph in FIG. 13 illustrates the relationship between the magnitude of the gyro sensor output and the input rate vector relative to the angular position of the rotor shaft 17. The angular position, direction of the input rate vector $\omega$, or its orthogonal components are resolved from the rotor position relative to the instrument case.

Accelerations along shaft 17 also result in bending of sensor element 13. However, both sides of sensor element 13 would bend in the same direction and the unique configuration of the fiber-optic interferometer comprising the sensor element would negate an output, as both legs of the interferometer would change length by the same amount and a length differential is required to generate a signal output.

Figures 12, 14:
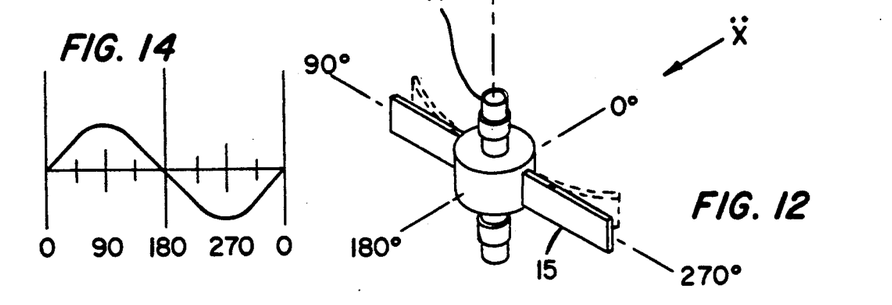

FIG. 12 illustrates the embodiment of the invention in an accelerometer configuration. The unique arrangement of the interferometer legs comprising the accelerometer sensing element 15 have been arranged such that bending of both sides of the sensor element 15 in the same direction results in an output that is proportional to the sensor beam deflection. The deflection of the sensor element 15 and the angular relationship of the sensor element to the applied acceleration x is illustrated. The effect on the interferometer sensor as embodied in sensor element 15 is to provide an optical output, interferometric fringes, whose fringe frequency or fringe displacement is proportional to the magnitude of the input acceleration. As for the gyro sensor, the direction of the sensed acceleration vector is resolved from the rotor position relative to the instrument case. The graph in FIG. 14 illustrates the relationship between the magnitude of the acceleration sensor output and the input acceleration vector relative to the angular position of the rotor shaft 17. The angular position, direction of the input acceleration vector x, or its orthogonal components are resolved from the rotor position relative to the instrument case.

Figure 15:
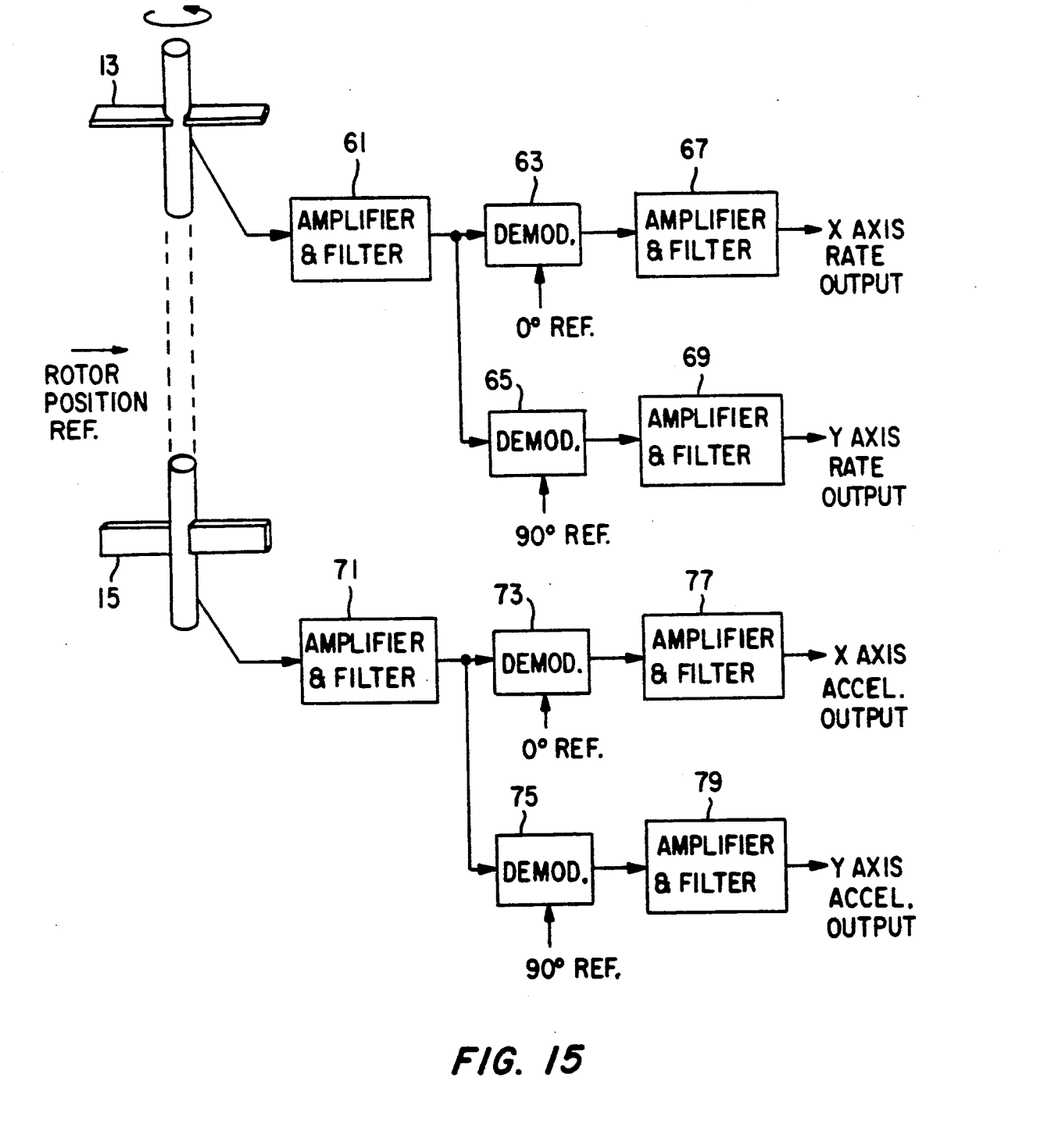
FIG. 15 is a block diagram showing the operation of the present invention.

Referring to FIG. 15, the gyro and accelerometer outputs may be resolved into the x and y components of the measured inertial inputs by signal processing using the instantaneous rotor position and an arbitrary zero reference position.

The gyro sensor element output is processed through an amplifier and filter 61 which transmits signals in suitable form to demodulators 63 and 65. Demodulator 63 is reference to "0" degree relative shaft position and to a fixed case position along an inertial reference axis, x, and demodulator 65 is orthogonally referenced, y, axis. The signals then flow through amplifiers and filters 67, 69 to provide X and Y axis outputs. Similar measurements are taken from the accelerometer sensing element 15, in which the signal is provided by amplifier and filter 71 to demodulators 73, 75 and amplifiers and filters 77, 79 in order to provide acceleration outputs at two axes.

It is not intended that this invention be limited to the hardware arrangement, or operational procedures shown disclosed. This invention includes all of the alterations and variations thereto as encompassed within the scope of the claims as follows.

I claim:

1. A fiber-optic interferometer gyroscope accelerometer comprising:
    a rate sensor rotatable around a spin axis for providing a rate sensor optical output representative of rotational rate;
    an acceleration sensor rotatable around a spin axis with said rate sensor for providing an acceleration sensor optical output representative of linear acceleration; wherein said rate sensor and said acceleration sensor each comprise a fiber-optic transducer; and,
    means to transmit optically said rate sensor optical output and said acceleration sensor optical output to a receiver which is fixed in rotation, said rate sensor optical output and said acceleration sensor optical output being substantially unchanged when transmitted to said receiver.

2. A fiber-optic gyroscope accelerometer as described in claim 1 further comprising:
    means to convert said rate sensor optical output and said acceleration sensor optical output to electrical signals; and,
    means to combine said electrical signals to provide rate measurements correlated with acceleration measurements.

3. A fiber-optic gyroscope accelerometer as described in claim 1 wherein said rate sensor senses two axes of inertial rate information via Coriolis accelerations acting to deflect one or more bender beam transducers.

4. A fiber-optic gyroscope accelerometer as described in claim 1 wherein said acceleration sensor senses two axes of acceleration information by sensing bending of one or more bender beam transducers due to linear accelerations.

5. A fiber-optic gyroscope accelerometer as described in claim 1 wherein said rate sensor and said acceleration sensor are mounted to a shaft which rotates around a spin axis.

6. A fiber-optic gyroscope accelerometer as described in claim 2 wherein said electrical signals representative of said rate sensor optical output and said acceleration sensor optical output are either digital or analog or a combination of digital and analog to provide both fine and course output resolution.

7. A fiber-optic gyroscope accelerometer as described in claim 1 wherein said rate sensor and said acceleration sensor comprise:
    integrated optics.

8. A fiber-optic gyroscope accelerometer as described in claim 1 wherein said rate sensor and said acceleration sensor comprise:
    discrete element optical components configured with fiber optic cable.

9. A method of measuring linear acceleration and inertial rate comprising:
    mounting one or more first bendable beams radially on a shaft rotating about a spin axis, said one or more first bendable beams having optical fiber and providing an acceleration sensor optical output representative of linear acceleration;
    mounting one or more second bendable beams radially on said shaft rotating about said spin axis, said one or more second bendable beams having optical fiber and providing a rate sensor optical output representative of inertial rate;
    transmitting optically said acceleration sensor optical output and said rate sensor optical output to a receiver which is fixed in rotation, said acceleration sensor optical output and said rate sensor optical output being substantially unchanged when transmitted to said receiver; and,
    converting said acceleration sensor optical output and said rate sensor optical output to an electrical signal.

* * * * *